W. A. DUNKUM.
GAUGE.
APPLICATION FILED MAR. 23, 1922.
1,432,979. Patented Oct. 24, 1922.
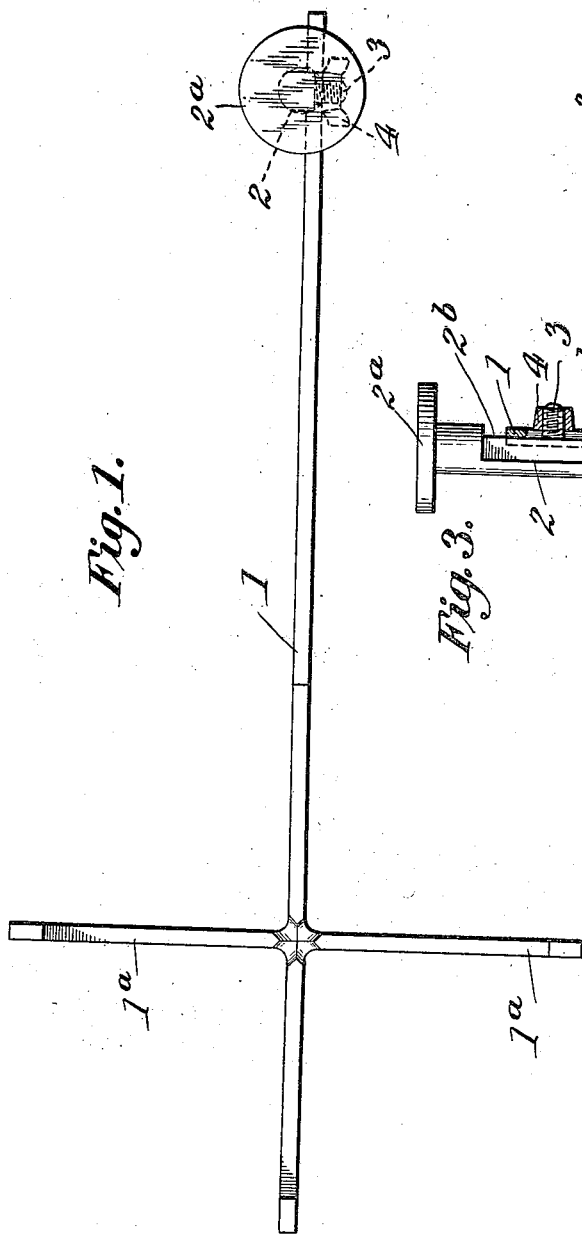
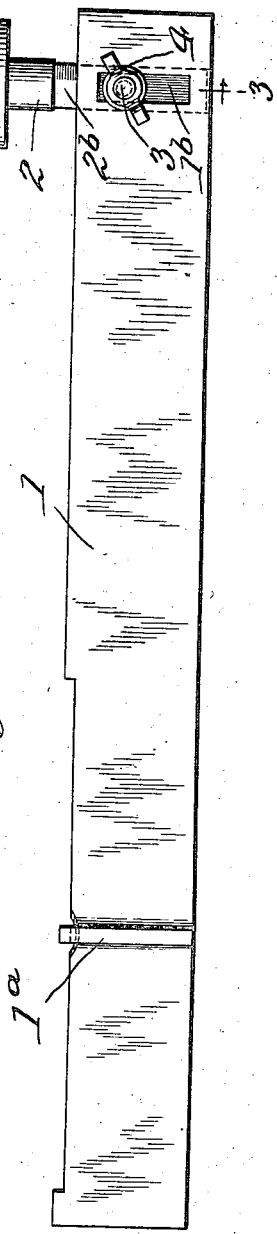
Inventor:
William A. Dunkum,
by Spear Middleton Donaldson & Hall
Attys.

Patented Oct. 24, 1922.

1,432,979

UNITED STATES PATENT OFFICE.

WILLIAM A. DUNKUM, OF NEWPORT NEWS, VIRGINIA.

GAUGE.

Application filed March 23, 1922. Serial No. 546,072.

*To all whom it may concern:*

Be it known that I, WILLIAM A. DUNKUM, a citizen of the United States, and resident of Newport News, in the county of Warwick and State of Virginia, have invented certain new and useful Improvements in Gauges, of which the following is a specification.

My present invention relates to an improved gauge designed especially for use in assembling the magnetos used in Ford motor cars.

These magnetos comprise a plurality of annularly arranged field coils carried by the engine casing and a plurality of annularly arranged permanent magnets carried by the fly wheel. In assembling the parts either initially or by way of repair, it is customary to apply the field coils in position, to secure the fly wheel to the crank shaft, and to thereafter adjust the field coils to secure the proper clearance, which is a difficult and tedious job, due to limited working space.

My invention aims to provide a gauge by which the field coils may be easily and accurately adjusted before the fly wheel with its armature magnets is applied to the crank shaft, and the invention comprises the novel form of gauge hereinafter described and particularly defined by the appended claims.

A gauge constructed in accordance with my invention is illustrated in the accompanying drawings, in which:—

Figure 1 is a plan view of the gauge,
Figure 2 a side view, and
Figure 3 is a section on line 3—3 of Figure 2.

Referring by reference characters to this drawing, the numeral 1 designates a gauge bar which is provided at one end with an adjustable gauge member 2 having a contact head $2^a$ designed to abut against the cores of the field coils, and having at the other end means for rotatably engaging the end of the engine shaft, whereby the gauge bar may be swung around said shaft end as an axis to bring the contact head successively into juxtaposition to the coils.

Such shaft end engaging means preferably takes the form of angularly extending arms $1^a$, the bar 1 and arms $1^a$ being rebated or cut away on one side to provide shoulders which, when the rebated edges are placed against the end of the engine shaft, overlie the outer peripheral edge of said shaft. These cut away portions in effect form a socket for receiving the end of the shaft. When so positioned the gauge bar may be swung around the engine shaft as an axis, the engagement of said shoulders with the shaft keeping the bar accurately centered in relation to the shaft. The gauge member 2 is adjustable transversely of the bar, or in other words, in a direction parallel to the axis of the shaft when the gauge is applied thereto, so that the head $2^a$ is adjustable towards and from the cores of the field coils. Said gauge member 2 is provided with graduations as shown, by means of which it may be set in the predetermined proper position, and by bringing the head $2^a$ successively into juxtaposition to the field coils these may be adjusted with perfect accuracy, so that when the fly wheel with its magnets is keyed to the engine shaft no further adjustment is necessary.

Any suitable means may be used to enable the gauge member 2 to be adjusted relative to the bar 1, but a very simple and inexpensive manner of accomplishing this is to provide the bar 1 with a transverse slot $1^b$ and the gauge member 2 with a flat side $2^b$ overlying this slotted portion and provided with a stud 3 passing through the slot, which stud is threaded to receive a wing nut 4.

Having thus described my invention, what I claim is:—

1. A gauge for the purpose described comprising an elongated member provided near one end with a shoulder, radiating arms carried by said member having inwardly facing shoulders, said shoulders being adapted to engage the periphery of the end of an engine shaft and hold the elongated member centered thereon, and a contact device carried by the other end of said member and transversely adjustable thereon.

2. A gauge for the purpose described, comprising an elongated member having radiating arms at one end provided with equidistant shoulders, the other end of said bar having a transverse slot, and a gauge member having a flat side bearing against said bar adjacent the slot, and a threaded stud passing through the slot, and a wing nut on said stud.

In testimony whereof, I affix my signature.

WILLIAM A. DUNKUM.